United States Patent Office 3,586,556
Patented June 22, 1971

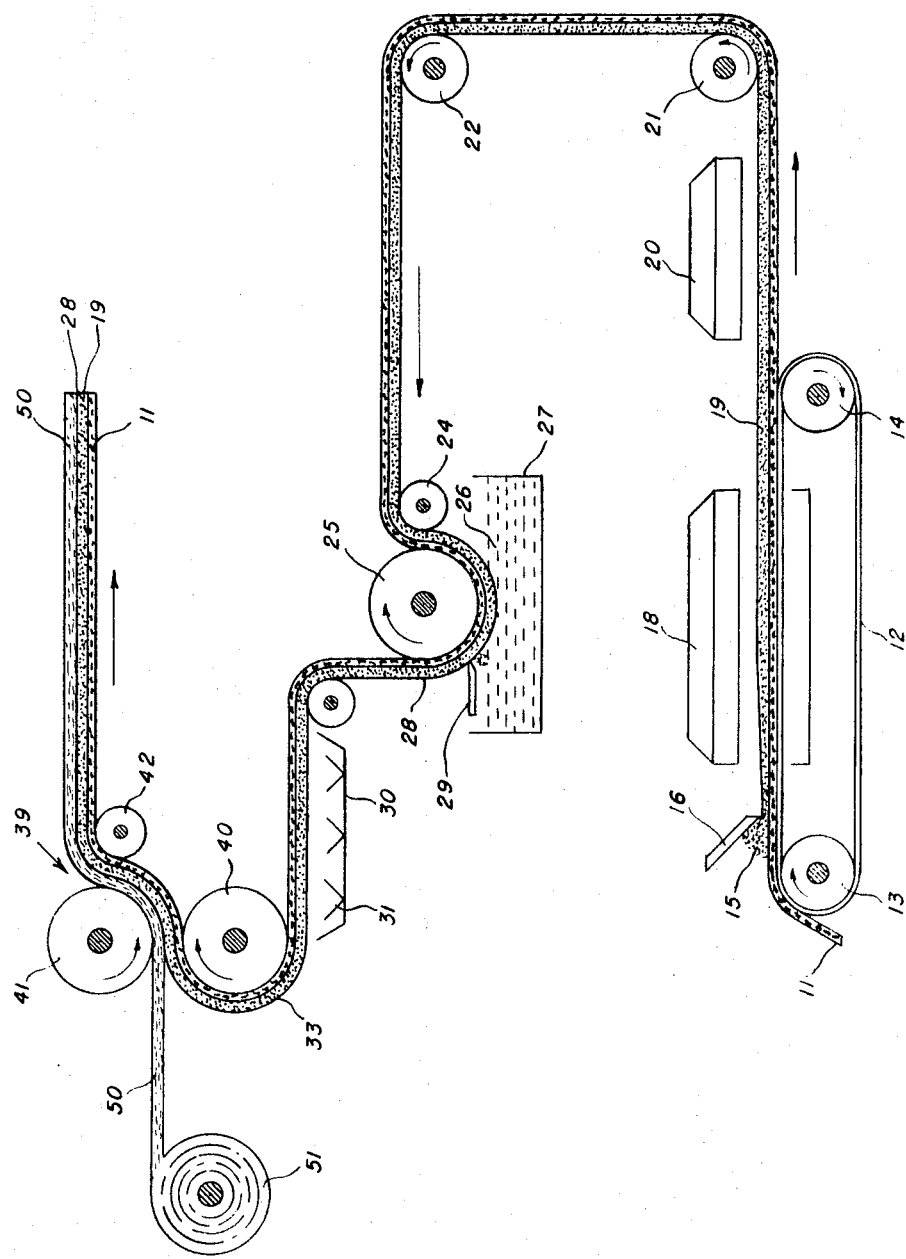

3,586,556
PROCESS FOR PRODUCING VINYL CHLORIDE POLYMER FOAM LAMINATES
James R. Clark, Princeton, N.J., and Frank E. Ehrenfeld, Jr., Brookhaven, Pa., assignors to Congoleum Industries, Inc., Kearny, N.J.
Filed Mar. 17, 1967, Ser. No. 623,869
Int. Cl. B32b 5/18
U.S. Cl. 156—79                    6 Claims

ABSTRACT OF THE DISCLOSURE

The invention relates to a process for producing a laminate containing a vinyl chloride polymer foam interlayer adhesively secured to a resinous composition wear layer. The process involves a first stage of applying a vinyl chloride polymer composition containing a chemical blowing agent as a smooth layer on a base and then heating the composition to decompose the blowing agent and form a foam layer on the base. The second stage of the process involves cooling the foam layer, applying an adhesive layer containing a volatile vehicle to a surface of the foam layer, heating to remove the volatile vehicle and then laminating the adhesive-covered foam to a resinous composition wear layer.

BACKGROUND OF THE INVENTION

This invention relates to smooth surface coverings useful for floors, walls and the like and particularly to a process for producing a surface covering having a resilient foam interlayer.

Smooth surface coverings bearing a layer of decorative and wear-resisting composition applied to and formed on an impregnated felted fibrous backing are well known and widely used as coverings for floors, walls and the like. The wearing surface of such products can be formed in many ways, such as pressing, extrusion, calendering and printing in the production of such well known products as printed felt base, linoleum, vinyl plastic flooring and the like. Such products are particularly useful as floor coverings since their smooth wearing surface can easily be cleaned. The presence of the felted fibrous backing besides being a base upon which the decorative layer is formed during manufacture, imparts a slight measure of resilience to the product. The resilience created by a thin layer of impregnated felt is only slight in comparison to that of well-known foamed rubber and plastics and considerable work has been directed toward incorporating a foam backing in smooth surface coverings.

A method of producing a foam-backed resinous composition product useful as a substitute for leather has been suggested in Roggi et al. 2,964,799. The method involves calendering a vinyl chloride polymer composition containing a blowing agent into a sheet without decomposing the blowing agent, laminating the sheet to a fabric layer on one surface and a thermoplastic resinous composition wear layer on the opposite surface. The laminate is then heated to decompose the blowing agent. The heat required for such decomposition is sufficient to bond the resinous wear layer to the foam layer. This type of process requires a relatively thin wear layer in order to allow sufficient heat to pass through the wear layer and decompose the blowing agent. The process, therefore, has limited application to products which require thick wear layers, such as flooring. The use of a layer of preformed vinyl chloride polymer foam composition applied to a felt as the backing is not generally successful because it results in destruction and degrading of the foam in the ovens required for processing the wear layer. As an illustration, a wear layer of vinyl composition is frequently formed by applying to a backing in the form of granules and processed at high temperatures and pressures to produce a product. The foam structure would be destroyed and thus rendered ineffective as a result of the pressing operation.

Another method of applying a foam backing layer to a resinous composition wear layer is to laminate a preformed sheet of foam directly to the back of the finished product. This technique has not yet met with great success. There are many problems involved in preparing and handling a sheet of foam in the thickness desired for floor covering purposes. For economic and handling reasons, the foam backing on a smooth surface covering cannot exceed 0.100 inch in thickness and normally is less than 0.050 inch thick. Such a thin foam sheet is extremely weak and readily stretches and tears when handled. This disadvantage has been overcome in some instances by utilizing a woven glass fiber backing or a felt backing and then laminating the backing to the wear layer. Such a procedure is shown in Boivin 3,002,868 and Petry 2,980,575.

A further method of applying a layer of foam to a surface covering product is to coat a liquid foam composition directly upon the back of a conventional felt-backed surface covering. The composition can be cast either as a foam or as a clear thin layer using a resinous composition containing a blowing agent which decomposes under the influence of heat to liberate a foam-producing gas. In either case, heat treatment of the layer is necessary to fuse the resin. Also, where a chemical blowing agent is used, the composition must be heated to a temperature sufficient to completely decompose the blowing agent. Temperatures of this heat-treating step can be as high as 400° F. When a foam composition is applied to the backing of a surface covering product and thereafter heated, the entire product including the decorative wearing surface is subjected to the high temperature conditions of the heat-treating step. This can have a detrimental effect on the decorative wearing surface since the composition can become softened, thereby causing the decoration to become smeared, and also can actually become degraded. Thus, such a method is not particularly desirable. A further disadvantage of this method is the cost of waste which results from faulty foaming. There are numerous problems involved in applying a thin layer of foam to a surface and considerable waste is to be anticipated in such an operation. Since the foam is applied directly to the back of the surface covering product, it is apparent that any waste will involve the entire product. This means that all the costs expended in producing the original surface covering are lost.

OBJECTS OF THE INVENTION

It is an object of the invention to provide a highly resilient surface covering having a vinyl chloride foam interlayer.

Another object of the invention is to produce such a product without distortion or degradation of the decorative wearing surface.

A further object of the invention is to produce such a product having a relatively thick wear layer of thermoplastic resinous composition by a method wherein waste resulting from the foam application step does not require scrapping the entire product.

A still further object of the invention is to produce a foam-backed surface covering by a method that does not result in degradation of the foam during manufacture. Other objects and the advantages of the invention will appear hereinafter.

SUMMARY OF INVENTION

In accordance with the invention, a decorative surface covering having a wear layer of at least 0.020 inch in thickness, a vinyl chloride polymer foam interlayer of at least 0.030 inch in thickness and a backing of at least 0.015 inch in thickness is prepared by applying a vinyl chloride polymer composition of defined strength at 350° F. containing a blowing agent to the surface of a base and heating the composition to decompose the blowing agent and form a cellular foam layer. The foam is then cooled and coated with an adhesive containing a vehicle which is volatile at a temperature of less than 300° F. The adhesive coating is then heated to a temperature between 200° F. and 300° F., sufficient to volatilize the solvent and tackify the adhesive. The tacky adhesive is then brought into contact with the wear layer and the sheets laminated together by the application of pressure. It has been found that the vinyl chloride polymer composition must have, at 350° F., a hot melt strength of at least 0.60 meterkilogram as defined hereinafter to prevent collapse of the foam structure.

DESCRIPTION OF DRAWING

The invention will be described with reference to the drawing which illustrates one embodiment of the method of producing a highly resilient decorative surface covering in accordance with the invention.

DESCRIPTION OF THE PREFERRED EMBODIMENT

With reference to the drawing, a backing sheet 11 which can be felt or a resinous composition layer is carried by a conveyor belt 12 which is driven by wheels 13, 14. A vinyl chloride polymer composition containing a blowing agent 15 is formed by a doctor blade 16 into a thin uniform sheet upon a surface of the felt sheet. In place of the doctor blade 16, any type of coating apparatus can be used such as a reverse roll coater.

The motion of the conveyor belt carries the mass through the oven 18 which can be of any type such as hot air or infrared heat lamps to yield a fused and foamed layer 19 applied to and formed on the felt backing 11. The foam layer is then passed through a cooling unit 20. The cooled foam layer is passed around guide rolls 21, 22 which invert the foam layer and then passes over a roll 24 and around a roll 25 in a supply of adhesive 26 maintained in bath 27 so that the exposed surface of the foam is coated with an adhesive layer 28. Excess adhesive is removed from the felt by means of a doctor blade 29. The adhesive coating 28 is dried by volatilizing the liquid vehicle and activated by passing through an oven 30 bearing radiant heating lamps 31. The adhesively-coated foam layer 33 is then passed to a laminating unit generally indicated at 39 made up of two rolls 40, 41. Simultaneously, a resinous composition wear layer 50 is supplied from supply roll 51 to the laminator. One surface of the resinous composition wear layer 50 is brought into contact with the activated adhesive in the laminator. The laminated product is withdrawn from the laminator over a roll 42 and comprises a decorative wearing surface 50, an adhesive layer 28, a foam layer 33 and a felt backing 11.

In accordance with the invention, a foamable vinyl chloride polymer composition is applied to the base. It is critical to the invention that the foamable composition has a hot melt torque of at least 600 metergrams and preferably at least 630 metergrams as measured on a brabender torque rheometer at about 350° F. A suitable brabender is manufactured by C. W. Brabender Co., South Hackensack, N.J. The brabender is a mixing device which contains a two-roll mill. The foamable composition without the blowing agent is added to the mixer and mixing is carried out by rotating the rolls at 30 revolutions per minute. The torque on the motor driving the rolls is measured by a dynameter. The enter mixing apparatus is contained in an oil bath maintained at 200° C. The torque is read as metergrams or meterkilograms. The measurement is actually a measurement of the viscosity of the composition at the temperature of operation. This torque reading can be converted to poises by the following formula which appears in an article entitled "A Rheological Interpretation of Torque Rheometer Data" by Goodrich and Porter, appearing in Polymer Preprints, American Chemical Society Division of Polymer Chemistry, page 292, vol. 7, No. 1, January 1966:

$$\eta_1 \text{ (poises)} = \frac{450M \text{ (meter-grams)}}{30 \text{ (r.p.m.)}}$$

The resinous binder is one that is coalesced or fused into a continuous film by the application of heat. In this specification and claims, the term "fused" is intended to mean that state which is achieved in a resinous composition during the transition from a random dispersion or suspension of discrete resin particles in plasticizer to one of a homogeneous consistency and uniform viscosity and rheological characteristics.

The foamable composition is also preferably a dispersion of resin in a liquid medium. Best results have been obtained with a dispersion of resin in a plasticizer which is conventionally termed a plastisol.

The preferred resins are polymers of vinyl chloride. The vinyl chloride polymers can either be simple, unmixed homopolymers of vinyl chloride or copolymers, terpolymers or the like thereof in which the essential polymeric structure of polyvinyl chloride is interspersed at intervals with the residues of other ethylenically unsaturated compounds polymerized therewith. The essential properties of the polymeric structure of polyvinyl chloride will be retained if not more than about 40 percent of the extraneous comonomer is copolymerized therein. Suitable extraneous comonomers include, for instance, vinyl esters such as vinyl bromide, vinyl fluoride, vinyl acetate, vinyl chloroacetate, vinyl butyrate, other fatty acid vinyl esters, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, the mono- and poly-chlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate and the like; vinylidene compounds such as vinylidene chloride, vinylidene bromide, vinylidene fluorochloride and the like; unsaturated hydrocarbons such as ethylene propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethyl-butadiene-1,3, piperylene, divinyl ketone and the like.

Resins adaptable for use in formulating vinyl plastisols are commonly referred to as dispersion grade resins. Such resins are available having particle sizes of from about 0.02 to about 2 microns in contrast to calender grade vinyl resins which are available in particle sizes ranging up to 35 microns. Dispersion grade resins are usually of higher molecular weight than calender grade resins and have particle surfaces of a hard, horny nature. Polymers of vinyl chloride having specific viscosities above about 0.25 and preferably between 0.30 and 0.70 as measured in a solution of 0.4 gram of resin in 100 milliliters of nitrobenzene at 30° C. are particularly effective. (ASTM D 1243–60 Specific viscosity is a comparison of the flow time for a control of pure nitrobenzene solvent as compared to the solution of nitrobenzene and resin. The specific viscosity is determined as the sample flow time divided by the control flow time, minus 1. The specific viscosity is an effective measure of relative molecular weight of the polymer, the higher the specific viscosity the higher being the molecular weight.

In the formulation of plastisol compositions for use in the invention, the fine particle size resin is uniformly dispersed in a mass of fluid plasticizer. The fluidity of plastisols is influenced in part by the particular resin and plasticizers selected, but is also a function of the ratio of plasticizer to resin. Plastisols become less fluid as the ratio of plasticizer to resin is reduced. Compositions for use in the invention preferably contain from about 40 to about 150 parts plasticizer per 100 parts resin with a range of about 50 to about 80 parts plasticizer per 100 parts resin being particularly effective. The viscosity of plastisol compositions can also be reduced by the addition of small amounts of a volatile diluent not exceeding about 10 parts per 100 parts resin. Useful diluents include benzene, toluene, methyl ethyl ketone, petroleum solvents such as V. M. & P. Naphtha (Boiling Range of 190–275° F.) and the like.

The selection of the plasticizer is important in determining the strength and flexibility of the coating and also influencing the viscosity and viscosity stability of the composition and the foaming characteristics of the foamable composition. Esters of straight and branched chain alcohols with aliphatic acids impart low viscosity and good viscosity stability. Typical plasticizers of this type include dibutyl sebacate, dioctyl sebacate, dioctyl adipate, didecyl adipate, dioctyl azelate, triethylene glycol di (2-ethylhexanoate), diethylene glycol dipelargonate, triethylene glycol dicaprylate, 2,2,4-trimethyl-1,3-pentanediol diisobutyrate, and the like. Plasticizers of the aromatic type, such as esters of aliphatic alcohols and aromatic acids or aromatic alcohols and aliphatic acids or aromatic alcohols and aromatic acids are desirable in that they impart good foaming characteristics to a plastisol, although the use of highly aromatic plasticizers is limited by their tendency to yield plastisols of high viscosity. Typical plasticizers of this type include dibutyl phthalate, dicapryl phthalate, dioctyl phthalate, dibutoxy ethyl phthalate, dipropylene glycol dibenzoate, butyl benzyl sebacate, butyl benzyl phthalate, dibenzyl sebacate, dibenzyl phthalate and the like. Other types of plasticizers, such as esters of inorganic acids, including tricresyl phosphate, octyl diphenyl phosphate and the like, alkyd derivatives of rosin, chlorinated paraffine, high molecular weight hydrocarbon condensates and the like can also be used. The plasticizer or blend of plasticizers is chosen to yield a composition of the desired viscosity and/or foaming characteristics. In addition, the plasticizer should preferably have a low vapor pressure at the temperatures required to fuse the resin. A vapor pressure of two millimeters of mercury or less at 400° F. has been found particularly satisfactory.

Minor amounts of stabilizers are usually incorporated in the coating compositions to reduce the effects of degradation by light and heat. Suitable light stabilizers include phenyl phthalate, phenyl benzoate, o-tolyl benzoate, o-nitrophenol, and organic phosphates and other complexes of such metals as barium, cadmium, calcium, zinc, strontium, lead, tin and the like. Suitable heat stabilizers include sulfides and sulfites of aluminum, silver, calcium, cadmium, magnesium, cerium, sodium, strontium, and the like, leucine, alanine, o- and p-amine benzoic acid and weak acid radicals including resorcinoleates and abietates, and the like. Normally, the compositions contain about 0.5 to about 5 parts stabilizer per 100 parts resin. The stabilizer in foamable compositions can exert influence on the decomposition of the blowing agent. Some stabilizers serve as catalyst causing the decomposition to take place at a lower temperature.

The coating compositions can contain pigments in accordance with the particular color desired. Any of the organic and inorganic pigments well known in the art for plastic compositions can be used. Normally, from about 0.5 to about 5 parts pigments per 100 parts resin are used.

The foamable compositions contain, in addition, an effective amount of blowing agent. The larger the amount of blowing agent within practical limits used, the greater is the expansion of the foam. Foam densities of from 12 to about 40 pounds per cubic foot can readily be obtained. Such results are attainable with from about 1 to about 20 parts blowing agent per 100 parts resin. About 2 to 10 parts blowing agent per 100 parts resin is particularly effective for the production of foams of a density which are most desirable for use in producing floor coverings in accordance with the invention.

Blowing agents are well known in the art and the particular blowing agent selected usually depends on such matters as cost, resin and density desired. While many compounds decompose by giving off a gas, only a relatively few are produced commercially in quantity. Complex organic compounds which, when heated, decompose to yield an inert gas and have residues which are compatible with the resin are preferred as blowing agents. Such materials have the property of decomposition over a narrow temperature range which is particularly desirable to obtain a good foam structure.

Typical types of blowing agent which can be mentioned include substituted nitroso compounds

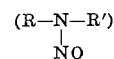

substituted hydrazides (RSO$_2$NHNHR'), substituted azo compounds (R—N=N—R'), acid azides (R—CON$_3$), guanyl compounds

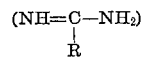

and the like wherein R and R' are hydrogen or hydrocarbon groups usually containing from one to ten carbon atoms.

The blowing agents which have found the most widespread use are those compounds having the >N—N< and —N=N— linkages which decompose at elevated temperatures to yield an inert gas high in nitrogen. These compounds have the general formula

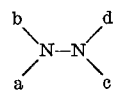

and

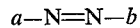

wherein a, b, c, and d are hydrocarbon groups, preferably containing up to ten carbon atoms, or hydrogen with at least one of the groups being a hydrocarbon group. Many of these hydrocarbon groups contain additional nitrogen groups such as hydrazide, amido, nito, nitrile and the like. The presence of such groups is also desirable since they can readily increase the amount of gas given off when heated to the decomposition temperature.

Typical blowing agents are azodicarbonamide, p,p'-oxybis (benzene sulfonyl hydrazide), p,p'-oxybis (benzene sulfonyl semicarbazide), azabisisobutyronitrile, N,N' - dimethyl - N,N' - dinitrosoterephthalamide, diazoaminobenzene, N,N' - dinitrosopentamethylenetetramine, aminoguanidine bicarbonate, p,p'-thiobis (benzene sulphonhydrazide), p,p'-diphenylmethane disulphonhydrazide, benzene m-disulphonhydrazide, benzene sulphonhydrazide, terephthalazide, benzazide, p-tert.-butyl benzazide, phthalazide, isophthalazide, 1,3-diphenyltriazene, azohexahydrobenzonitrile, azo dicarboxylic acid diethyl ester, naphthalene-1,5-disulfonyl hydrazide and biuret.

Blowing agents for use in the invention must be decomposed an effective amount at a temperature below the decomposition temperature of the resin used.

It is common practice to add accelerators or catalysts to the compositions to accelerate the decomposition of the blowing agents, reduce the decomposition temperature and/or narrow the decomposition temperature range. Typical types of accelerators are various metal salts such as dibasic lead phosphite, dibasic lead stearate, dibasic lead phthalate and similar lead salts, zinc salts such as zinc laurate, zinc oxide, zinc stearate, zinc carbonate, zinc salt of mercaptobenzothiazole, zinc octoate, zinc naphtholate, zinc dust, and cadmium octoate. These agents can also serve as stabilizers for the composition.

The felt backing on which the foam is applied is a felted cellulose or inorganic fibrous sheet which can be impregnated with a water-proofing and strengthening saturant. The sources of cellulose can include cotton or other rags, wood pulp, paper boxes or mixtures thereof in any proportions. The inorganic fibers are usually asbestos. In addition, fillers such as wood flour can be used. Any of the conventional techniques of sheet formation can be used as for example, a Fourdrinier or cylinder paper machine. Other fibrous materials can be used including those of animal or synthetic origin.

Felted cellulose fibrous sheets as produced by conventional sheet-forming techniques are unsatisfactory for use in surface coverings due to their poor water resistance. In addition, they lack sufficient strength to withstand the strains of processing. The factor of strength is particularly important since the thin layer of foam cast upon the felt has no appreciable strength of its own. The felt should not only be strong and water-resistant, but it also should be resistant to tearing and have appreciable strength when bent.

Strength and water resistance can be imparted to a felt sheet by impregnation. The particular impregnant used must not only impart the characteristics of strength and water resistance to the sheet, but in addition, must meet essential requirements as to its physical and chemical behavior at high temperatures. The foam compositions applied to the felt in accordance with the invention must be heated to elevated temperatures in order to cure the foam. When a thermoplastic resinous plastisol composition containing a blowing agent is applied to the felt, heating to a temperature as high as about 400° F. is necessary in order to completely decompose the blowing agent in the plastisol and to fuse the composition. Since the foam layer is intimately bound to the felt, the felt sheet itself will attain very nearly the same temperature as the foam. Thus, the felt impregnant chosen must be stable at these elevated temperatures. The impregnant should be substantially free of any components which are volatile at these temperatures and it also must not soften to such an extent as to exude from the sheet. In addition, the impregnant should not become embrittled when exposed to high temperatures or be subject to appreciable detrimental chemical changes such as oxidation.

Suitable impregnants which possess these qualities include such resinous materials as the vinyl resins such as polyvinyl chloride, polyvinyl acetate, polymerized vinylidene chloride, mixtures and copolymers of these with each other and with other monomers, polymerized acrylic acid and its copolymers, polystyrene, butadiene-styrene copolymer, butadiene-acrylonitrile copolymer, polymerized chloroprene and the like. Thermosetting resins which under the influence of heat cure by polymerizing and cross-linking can also be used as impregnants. Such resins as phenolic resins, polyesters, oleoresinous materials, such as natural and synthetic driving oils and the like, isocyanates, polyurethanes and the like are suitable.

The impregnant can be incorporated into the fibrous sheet by passing the sheet through an emulsion or solution of the resin followed by drying of the sheet to remove the solvent. Alternately, the resin can be added in fine particles to the fibers prior to sheet formation either as solid particles of resin or as an emulsion in water or other fluid.

The thickness of an impregnated felted cellulose fibrous sheet should be at least 0.015 inch. Where the furnish is made up principally of wood pulp fibers a sheet thickness of 0.025 inch is required to maintain the minimum strength values. In general, it is preferred that the thickness of the felt be maintained as low as possible in order to keep the thickness of the finished product within reasonable limits. It is preferable, therefore, that the felt sheet to which the layer of foam is applied in accordance with the invention have a thickness between 0.020 and 0.040 inch with the particular furnish and impregnating system being chosen so that the sheet will have sufficient strength during processing.

After the resinous composition layer has been cast upon the felt as a thin uniform layer of a foamable composition containing a blowing agent, the mass is then subjected to heat. The heat treatment is necessary to fuse the resin, a process wherein the individual minute particles of resin become solvated by the plasticizer. In addition, the heat treatment is required in order to decompose the blowing agent in the composition. Heat can be by any of the conventional techniques used for high temperature treatment of sheet material, that is radiant heating elements can be used or the sheet can be passed through a conventional hot air oven maintained at the desired temperature. After the product is removed from the oven, it is then cooled in order that the foam structure will not become damaged as a result of the subsequent lamination to the felt-backed surface covering. Cooling can be affected by permitting the product to stand exposed to the air for a sufficient length of time or, alternately, streams of cool air or other gas can be blown directly over the product.

The final step required in the production of products in accordance with the invention is the lamination of the foam to a resinous composition wear layer. A common type wear layer comprises a layer of pigmented plasticized thermoplastic resinous composition. Such resins as polyvinyl chloride, vinyl chloride-vinyl acetate copolymer and the like are widely used. Decorative effects can be created by any of the conventional techniques such as molding, pressing or calendering.

In accordance with the invention the decorative resinous composition wear layer is adhesively laminated to the sheet of felt bearing the thin layer of foam. In the lamination process, the adhesive is applied to the foam. The process of the invention makes possible the utilization of conventional inexpensive adhesives of the liquid vehicle type. Typical adhesives include thermoplastic adhesives such as polyvinyl acetate, polyvinyl chloride, polymerized acrylic acid, polymerized and copolymerized derivatives of acrylic acid such as ethyl acrylate, and the like either as an emulsion in water or other dispersing medium or dissolved in a compatible organic solvent. Rubber cements, such as emulsions and solutions of natural rubber, butadiene-styrene copolymer, butadiene-acrylonirile copolymer, chlorinated rubber, polymerized chloroprene and the like either with or without the presence of added tackifiers are also useful. The adhesive can contain additional components, such as anti-foam agents, thickeners, fillers and the like. An example of a particularly effective adhesive is a blend of an emulsion of butadiene-acrylonitrile copolymer (Hycar, manufactured by B. F. Goodrich Chemical Company, Cleveland, Ohio) and an emulsion of a thermoplastic resinous fraction derived from pinewood having a softening point of 234° F. (Vinsol, manufactured by Hercules Powder Company, Wilmington, Del.). Adhesives of this type are disclosed in U.S. Pat. 2,757,711, issued Aug. 7, 1956, to R. K. Petry et al. Another particularly useful adhesive is one containing the acrylic emulsion polymer Rhoplex AC–34, manufactured by Rohm & Haas Co., Philadelphia, Pa.

The adhesive is applied to the surface of the foam layer by any of the conventional techniques such as roller coating, doctor knife application and the like.

The application rate is preferably about 0.1 to 0.4 pound per square yard. After application, the adhesive coating is subjected to heat of about 200 to about 300° F. in order to remove the vehicle and tackify the adhesive. After heating of the adhesive film, the two sheets are laminated together. Lamination is most commonly brought about by passing the two sheets together to the nip between two rolls. The pressure applied should only be sufficient to obtain a good bond between the two layers.

The product produced in accordance with the invention comprises a decorative wearing surface, an intermediate layer of resilient foam and a felt backing. The production of products in accordance with the invention offers numerous advantages over techniques of the prior art. The most important advantage is that it makes possible the utilization of inexpensive latex adhesive. Further, any waste resulting from faulty performance of the foam application step involves merely scrapping the foam and the felt to which it is applied. There is no loss or waste of any of the decorative surface covering product. The heating step required in the foaming subjects only the foam and the felt to which it is applied to heat. There is, therefore, no possibility of distortion or degradation of the decorative wearing surface of the surface covering product. Also, since the foam is cast upon a backing with appreciable strength and resistance to stretch, there is no chance for the foam to become distorted and torn during application to the surface covering product.

The following example is given for purposes of illustration:

EXAMPLE I

A foamable resinous plastisol composition with the following composition was formulated:

| | Parts |
|---|---|
| Polyvinyl chloride (dispersion grade, specific viscosity 0.60) | 50 |
| Polyvinyl chloride (dispersion grade, specific viscosity 0.40) | 50 |
| Butyl benzyl phthalate | 52 |
| Alkyl aryl hydrocarbon (secondary plasticizer) | 18 |
| Azodicarbonamide | 3.0 |
| Dibasic lead phosphite | 2.0 |
| Pigment (TiO$_2$) | 5.0 |
| V. M. & P. Naphtha (Boiling Range 190–275° F.) | 5 |

The plastisol which had a hot melt strength of 0.66 meterkilogram was doctored upon a sheet of impregnated felted cellulose fibers having a thickness of 0.025 inch to provide a clear unblown film having a thickness of 0.010 inch. The felt sheet was impregnated with 8% polyvinyl acetate and 30% light-colored petroleum resin. The sheet was then placed in an oven maintained at 390° F. for two minutes thereby fusing the resin in the plastisol and completely decomposing the blowing agent to expand the plastisol into a uniform foam having a thickness of 0.040 inch. The density of the foam was 16 pounds per cubic foot.

A decorative sheet was prepared by depositing chips, approximately 0.015 inch in thickness, of pigmented and filled plasticized vinyl chloride composition in contrasting colors on a vinyl chloride resinous composition sheet having a thickness of 0.025 inch. The chips were consolidated into the sheet to form a smooth layer having a thickness of 0.030 inch by passing between heated calender rolls.

The foam layer was coated at an application rate of 0.125 pound per square yard with the following adhesive composition:

| | Parts |
|---|---|
| Copolymer of ethylacrylate and butylacrylate (46% solids in water) | 100.0 |
| Sodium salt of methacrylic acid | 1.0 |
| Anti-foam | 0.25 |

The coated side was heated at 275° F. to render the adhesive coating tacky and remove the water. The heated adhesive was brought into contact with the decorative sheet by passage between two rolls. The product was a smooth vinyl wearing surface, a resilient vinyl foam interlayer and a felt backing possessing excellent resilience and comfort underfoot.

Any departure from the foregoing description which conforms to the invention is intended to be included within the scope of the claims.

What is claimed is:

1. In a method for producing a decorative resilient surface covering having resinous composition wear layer of at least 0.020 inch in thickness, a vinyl chloride polymer foam composition layer of at least 0.030 inch in thickness bonded to one surface of said wear layer and a felt backing sheet of at least 0.015 inch in thickness bonded to the opposite surface of said foam layer by laminating said wear layer to said foam layer, the improvement which comprises forming said foam layer on one surface of said backing by coating a liquid vinyl chloride polymer composition having a hot melt strength of at least 0.060 meterkilogram containing a blowing agent on one surface of said backing, heating to decompose said blowing agent and form said foam layer, cooling said foam layer, applying a liquid, heat-activated thermoplastic adhesive to the surface of said foam layer, heating said adhesive to a temperature of about 200 to about 300° F. to activate said thermoplastic adhesive and remove any volatiles and immediately laminating said activated adhesive-coated foam layer to one surface of said resinous composition wear layer by passage between unheated rolls which supply only sufficient pressure to unite said surfaces and insufficient to collapse said foam layer.

2. The method of claim 1 wherein said adhesive is an acrylic latex adhesive and said heating is sufficient to evaporate all of the water in said latex.

3. The process of claim 1 wherein said hot melt strength is about 0.66 meterkilogram.

4. The process of claim 1 wherein said felt backing is a cellulosic felt sheet impregnated with a resinous composition having a thickness of about 0.020 to about 0.040 inch.

5. The method of claim 1 wherein said blowing agent is azodicarbonamide.

6. The method of claim 1 wherein said adhesive is applied at the rate of approximately 0.1 to about 0.4 pound per square yard of foam surface.

References Cited

UNITED STATES PATENTS

| | | | |
|---|---|---|---|
| 2,866,730 | 12/1958 | Potchen et al. | 156—79X |
| 2,964,799 | 12/1960 | Roggi et al. | 264—47 |
| 3,186,889 | 6/1965 | Boldrini et al. | 156—333X |
| 3,206,354 | 9/1965 | Pooley | 156—79X |

BENJAMIN R. PADGETT, Primary Examiner

S. HELLMAN, Assistant Examiner

UNITED STATES PATENT OFFICE
CERTIFICATE OF CORRECTION

Patent No. 3,586,556　　　　　　　　Dated　June 22, 1971

Inventor(s)　James R. Clark et al.

It is certified that error appears in the above-identified patent and that said Letters Patent are hereby corrected as shown below:

Column 2, line 13, after "not" cancel "yet"; Column 4, line 6, "enter" should read -- entire --; line 75, after "D 1243-60" insert a closed parenthesis. Column 5, line 27, before "influencing" insert -- in --. Column 7, line 67, after "synthetic" change "driving" to drying --. Column 8, line 56, "acrylonirile" should read -- acrylonitrile --. Column 10, line 28, "0.060" should read -- 0.60 --.

Signed and sealed this 25th day of July 1972.

(SEAL)
Attest:

EDWARD M. FLETCHER, JR.　　　　　　　　ROBERT GOTTSCHALK
Attesting Officer　　　　　　　　　　　Commissioner of Patents